April 24, 1962
I. L. OLIVER
3,031,212
PIPE TO WALL CONNECTION HAVING INJECTION
TYPE SECURING AND SEALING MEANS
Filed Dec. 6, 1957
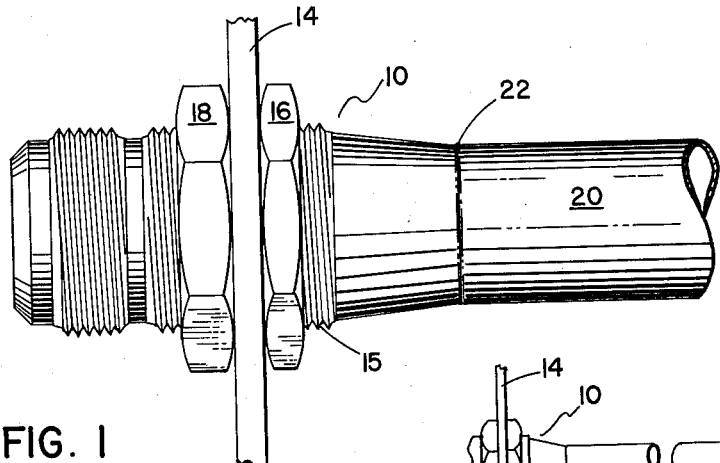
FIG. 1
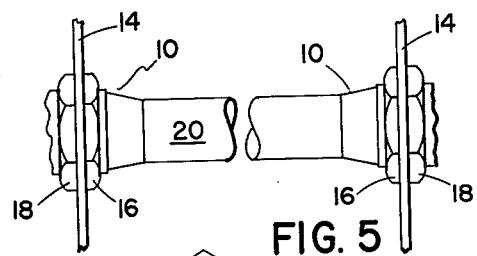
FIG. 5
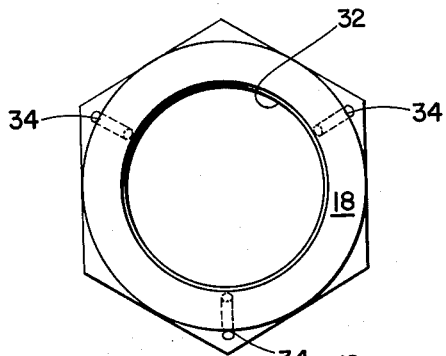
FIG. 2
FIG. 3
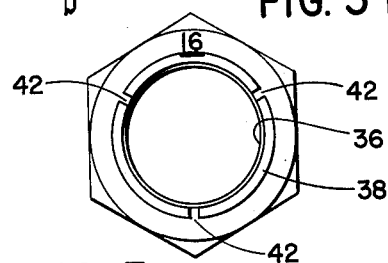
FIG. 6
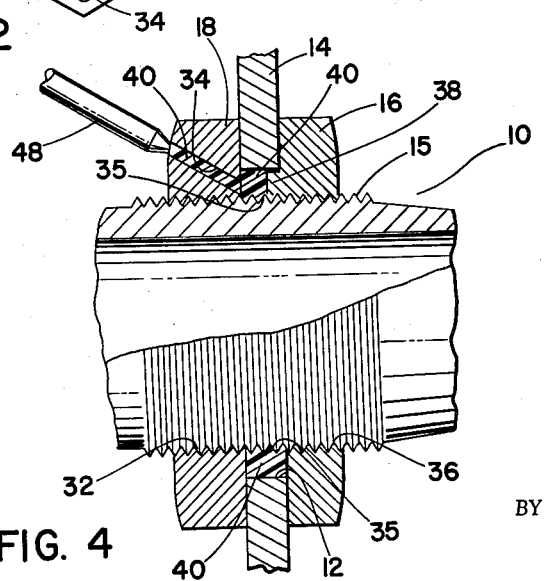
FIG. 4
IVAN L. OLIVER
INVENTOR.
BY Duane C. Bowen

United States Patent Office 3,031,212
Patented Apr. 24, 1962

3,031,212
PIPE TO WALL CONNECTION HAVING INJECTION TYPE SECURING AND SEALING MEANS
Ivan L. Oliver, Wichita, Kans., assignor to Boeing Airplane Company, Wichita, Kans., a corporation of Delaware
Filed Dec. 6, 1957, Ser. No. 701,063
4 Claims. (Cl. 285—192)

My invention relates to means for supporting, securing and effecting a fluid tight seal for a tube passing through a bulkhead or the like. An adjustable tube fitting is provided adapted for injection sealing and achieving locking of nuts on the fitting by the sealant. A similiar locking means is provided for other applications of lock-nuts.

The invention applies to the fabrication of tanks, containers or compartments which have one or more tubular bodies or fluid conducting pipes passing through a wall or walls thereof. The compartment may be a fluid container and it is frequently a difficult problem to provide leak-proof joints for such tubes or pipes. A specific example is in aircraft construction where structure including wing and body skins form integral fuel cells, oil tanks and the like, through which hydraulic lines or the like must pass.

Prior seals used for this purpose are commonly of the O-ring type. The rubber or a synthetic O-ring has disadvantages in some applications such as the present type fitting and it is an object of my invention to substitute other sealing means in the fitting. Some of the disadvantages of O-rings or other prior packing type seals are: The annular groove into which the O-ring must seat requires close tolerance machining and a precision finish for the seal to be effective. The O-ring is subject to damage from cuts or stretching as it is pushed or otherwise moved over threads or other sharp edges of the fitting which may be of a greater diameter than the mean diameter of the O-ring. A new O-ring is usually required if the fitting is disassembled for repair. Retainer nuts, bolts or screws must be locked in place by locking wires or other mechanical devices. The seal assembly usually has to be completely disassembled for repair, which requires removal of the fluid contained within the container into which the tube passes. Repairing a leak about such seals is complex and time consuming.

A general object of my invention is to provide a simple fitting providing a fluid tight seal between the fitting and a bulkhead or wall having an opening in which the fitting is installed. My sealing means does not depend for its effectiveness upon the compression of fasteners, does not interfere with the positive engagement of the fitting to the tank wall, and does not affect the structural strength of the connection.

Another object of my invention is to provide a tube fitting receiving a sealant introduced under pressure and which renders and preserves a fluid tight seal. The fitting is ported to receive the sealant introduced under substantial pressure, and maintains an effective, continuous annular ring of sealing engagement between the sealant and the opposing surfaces of the fitting and bulkhead. An indication is given if the fitting is loose or improperly installed by failure of sealant to extrude serially about the injection openings or by extrusion through other parts of the joint and remedial action may be taken.

A further object of my invention is to provide a fitting with which a leak can be repaired and the sealant replaced without removing pressure from the seal, e.g., without draining fluid contained within the tank, without disassembly of the fitting, and without entering the compartment sealed.

It is also an object of my invention to provide continuity of the fluid line passing through the tank, e.g., to avoid connections such as unions or couplings within the tank as a possible source of leakage between the line conducted fluid and the tank contained fluid. A related objective is to avoid problems of tolerances in the length of pipes or the spacing of pipe couplings relative the tolerances of tank dimensions between walls.

Still further objects of my invention are to provide a fitting which requires no special finish or surface smoothness, to eliminate the need of locking wires or other mechanical locking devices for retainer nuts and the like in such fitting and in other applications, and to provide an economical, efficient and durable fitting.

My invention will be best understood, together with additional objectives and advantages thereof, from a reading of the following description, read with reference to the drawings, in which:

FIGURE 1 is a side view of a specific embodiment of my fitting installed in a bulkhead;

FIGURE 2 is a plan view of the face of the outer nut through which sealant is injected;

FIGURE 3 is a plan view of the bulkhead abutting face of the inner nut;

FIGURE 4 is an enlarged fragmentary view, principally in section, of the fitting shown in FIGURE 1;

FIGURE 5 is a side view showing a line incorporating my fittings and passing through opposite walls of a fuel tank; and FIGURE 6 is a fragmentary view, partly in section, showing a modification of the invention for the purpose of locking a nut.

A specific example of my invention is its use in jet aircraft integral fuel tanks through which hydraulic lines must pass and FIGURE 5 shows opposite walls 14 of such fuel tank. Line 20 extends therethrough and, for example, may carry hydraulic fluid. The invention may be used in other structures and with other fluids. In any installation, the sealant employed must be of a character to form a fairly permanent seal against the particular fluid contained within the tank. Therefore, it is desirable to employ a viscous material that will remain somewhat plastic and will not be attacked by, soluble in, or otherwise adversely affected by the fluid.

A mastic type polysulfide rubber sealant is preferred for tanks containing JP–4 aircraft fuel as sealants of this type have a satisfactory life despite the aromatic solvent properties of the fuel. A curing-type polysulfide rubber sealant may be used for some applications but this can not be replaced by injection and is not preferred. Various types of mastics and other sealants are available on the market and the selection of a suitable sealant for various applications will be understood by those working in the art.

FIGURES 1 and 4 show a nipple 10 extending through an opening 12 in a bulkhead 14. Threads 15 on the nipple are preferably continuous across the bulkhead for maximum adjustability. Inner and outer nuts 16, 18 are threadedly engaged on nipple 10 and abutted against the inner and outer surfaces respectively of bulkhead 14. Nipple 10 is shown joined to a length of tubing 20 by a weld 22 and a mechanical connection or integral construction may be used. However, the use of a coupling or union would mean possible fluid connection with the interior of the tank in case of leakage and the welded or integral construction avoids this possibility and is an advantage of my invention.

Outer nut 18 is shown in FIGURE 2 having interior threads 32 and having sealant injection openings 34 120° apart, effective to fill the annular cavity 35 formed between the walls of opening 12 and nipple 10, as shown in FIGURE 4. These openings 34 also serve as vent passages to allow the escape of air from the cavity during the sealing operation. The number of sealant injection openings is dependent upon the size of nut and the viscosity of the sealant used but a minimum of two are required. Openings 34 are angled inwardly and terminate adjacent the threaded surface 15 of nipple 10.

FIGURE 3 shows the inner nut 16, having internal threads 36 and an annular flange 38 extending from its bulkhead abutting face. The dimensions of the flange are related to the thickness of the bulkhead and to the diameter of opening 12. Due to contraction of the sealant, as 40, under conditions of extreme cold there is minimum cross sectional dimensions of the sealant that can be effectively used. The placement of the dimensions is optional but the sealant preferably has a minimum cross section of .055×.125 to prevent leakage, caused by the sealant's contraction from abutting bulkhead and nipple surfaces, at the possible low temperatures of aircraft environment and with mastic sealants presently used. The flange 38 is shown as having radial slots 42 120° apart. Sealant 40 in the slots locks inner nut 16 against turning. The internal diameter of the flange is slightly more than the diameter of the crests of threads 15 on nipple 10.

Referring to FIGURE 4, nipple 10 is shown extending through opening 12 in bulkhead 14. Inner nut 16 is in threaded engagement with the nipple and abuts the inner surface of the bulkhead. Annular flange 38 is disposed in opening 12 and has a free fit therewith, e.g., has no appreciable play, to center the nipple thereby effecting an even distribution of sealant in the annular cavity. Outer nut 18 is shown in threaded engagement with nipple 10 and abutting the outer surface of bulkhead 14. One of the sealant injection passages 34 is shown joining annular cavity adjacent threads 15. Injection passage 34, radial slots 42 and annular cavity 35 are shown filled with sealant 40. In the bottom portion of FIGURE 4, flange 38 of nut 16 is not shown because the section passes through one of the radial slots 42 in flange 38.

In the installation of tube 20 and the securing and sealing of fittings 10 in bulkheads 14 of a tank, as shown in FIGURE 5, a first end of tube 20 is inserted through opening 12 in a first bulkhead into the tank or compartment. An inner nut 16 is threaded on to nipple 10 at the inserted end of tube 20. This is accomplished from within the tank through an access opening. The nut is run off the threads on to the tube between the two nipples 10. The first end of the tube is then inserted through the identical opening 12 in the opposite wall of the tank and the second end of the tube is pulled into the interior. A second inner nut is threaded on to the second end of the tube from within the tank. The inner nuts are directed with annular flanges 38 toward the outside. The first inner nut 16 is now threaded back onto a nipple 10 and the inner nuts are adjusted to center tube 20 and opposed nipples 10 between the tank walls. Threads 15 being substantially continuous, the nuts 16 provide wide adjustablity to the spacing of the tank walls. By this construction, a problem of tolerances is avoided that would be present if a fixed flanged coupling at each end of the pipe were used.

All subsequent work of the installation and sealing is accomplished from outside the tank. Outer nuts 18 are installed in threaded engagement with nipples 10, one on each end of tube 20, and torqued to a specified reading. The tip 48 of a pressure sealant gun is then inserted in one of the openings 34 in each outer nut 18 and sealant is injected. If the preferred mastic type sealant is used, a pressure gun with as much as five thousand pounds operating pressure may be required to effectively force the sealant into and through passages 34, and to evenly distribute the sealant throughout annular cavity 35. The mastic type sealant at time of injection should be of a pliant, very thick, putty-like consistency and requires the relatively high pressures for injection. If a rubber-type sealant is used, a pressure gun with approximately a hundred pounds operating pressure is sufficient for injection. This type of sealant should be of a semi-fluid consistency when injected and a relatively low pressure is required to inject and evenly distribute the sealant throughout passages 34 and annular cavity 35.

If outer nut 18 is small and has only two injection openings 34, the sealant is injected at the first opening until it is observed coming out the second opening. If outer nut 18 is large and has three or more injection openings, sealant is injected serially from opening to opening. Injection is continued at each opening until sealant ejects from the next unfilled opening. The injection should be continued until it is observed that the emerging sealant is of a continuous solid mass to prevent any air pockets from being left in the cavity. The ejection of sealant from all of the openings is an indication to the operator that the cavity is filled. It will be understood that the cavity, including passages 34 and slots 42 of flange 38, is filled with sealant, that the sealant provides a permanent or long life, fluid-tight seal between the fitting 10 and bulkhead 14, and that the sealant in the radial slots 42 of annular flange 38 and in the passages 34 provides a locking means to prevent nuts 16 and 18 from loosening.

If mastic type sealant is used, a pressure check may be made immediately to prove the integrity of the seal. If it is determined from the pressure check that the seal is defective, then reinjection of sealant may be made.

If a curing type rubber sealant is used and a leak is detected after pessure checking the seal, then it will be necessary before reinjection to remove outer nut 18 and thoroughly remove all of the cured sealant from the sealant injection passages 34, annular cavity 35, and radial slots 42 of inner nut 16. After which procedure, outer nut 18 may be reinstalled and the sealant reinjected.

FIGURE 6 shows the adaptation of a part of my invention for the sole purpose of locking a nut 50 on a tube or bolt 52. In the absence of the annular seating cavity 35 of FIGURE 4 and the requirement of a seal, one or more sealant passageways, as 54, may be provided direct to the threads 56 of the bolt. Sealant 58 or other viscous material is injected through passageway 54 and preferably with sufficient pressure to spread between the threads on the bolt and nut, thereby to lock the nut in place against rotation. The injected material should be of a type adhering to the metal and will lock the nut both as a bond between nut and bolt threaded surfaces and as a pin-shaped body adhering to threads 56 and extending into passageway 54.

Having thus specifically described my invention, I do not wish to be understood as limiting myself to the precise details of construction shown, but instead wish to cover those modifications thereof which will occur to those skilled in the art from my disclosure and which fall within the scope of my invention, as described in the following claims.

I claim:

1. Sealing and securing means for a tube extending through an opening in a wall of a tank or the like, comprising: said tube having continuous exterior threads extending through said opening and including substantial portions at each side of said wall whereby said tube may be adjusted in position relative to said wall in an axial direction and then may be secured by nut means, an inner nut threadedly engaged with the threads on said tube and having a flat face directly abutting the interior surface of said wall about said opening, an outer nut threadedly engaged with the threads on said tube and having a flat face directly abutting the exterior surface of said wall about said opening, said tube, said nuts and the walls of said opening being spaced in the plane of said wall forming an annular cavity therebetween and said outer nut having a plurality of passageways therethrough from the exterior of said wall to said annular cavity for injection of sealant, said inner nut having an annular flange disposed in said cavity and engaged with the walls of said opening thereby centering said tube in said opening and said flange being slotted, an injectable sealant injected through said passageways and filling and sealing said cavity, and said sealant filling said passageways in said outer nut and the slot in the flange of said inner nut thereby locking said nuts in place.

2. Sealing and securing means for a tube extending through an opening in a wall of a tank or the like, comprising: said tube having exterior threads and including portions at each side of said wall, a first nut threadedly engaged with the threads on said tube and having a flat face directly abutting one surface of said wall about said opening, a second nut threadedly engaged with the threads on said tube and having a flat face directly abutting the surface of said wall about said opening on the opposite side from said first nut, said tube, said nuts and the walls of said opening being spaced in the plane of said wall forming an annular cavity therebetween and said first nut having a plurality of passageways therethrough from the exterior of said first nut to said annular cavity for injection of sealant, said second nut having an annular flange disposed in said cavity and engaged with the walls of said opening thereby centering said tube in said opening and said flange being slotted, an injectable sealant injected through said passageways and filling and sealing said cavity, and said sealant filling said passageways in said first nut and the slot in the flange of said second nut thereby locking said nuts in place.

3. Sealing and securing means for a tube extending through an opening in a wall of a tank or the like, comprising: said tube having exterior threads and including portions at each side of said wall, a first nut threadedly engaged with the threads on said tube and having a flat face directly abutting one surface of said wall about said opening, a second nut threadedly engaged with the threads on said tube and having a flat face directly abutting the surface of said wall about said opening on the opposite side from said first nut, said tube, said nuts and the walls of said opening being spaced in the plane of said wall forming an annular cavity therebetween and said first nut having a plurality of passageways therethrough from the exterior of said first nut to said annular cavity for injection of sealant, one of said nuts having flange means disposed in said cavity and engaged with the walls of said opening thereby centering said tube in said opening, an injectable sealant injected through said passageways and filling and sealing said cavity, said sealant filling said passageways in said first nut thereby locking said first nut in place and said second nut having on its surface facing said annular cavity a portion that is recessed relative to the remainder of the surface and said sealant filling said recessed portion thereby locking said second nut in place.

4. Sealing and securing means for a tube extending through an opening in a wall of a tank or the like, comprising: said tube having exterior threads and including portions at each side of said wall, a first nut threadedly engaged with the threads on said tube and having a flat face directly abutting one surface of said wall about said opening, a second nut threadedly engaged with the threads on said tube and having a flat face directly abutting the surface of said wall about said opening on the opposite side from said first nut, said tube, said nuts and the walls of said opening being spaced in the plane of said wall forming an annular cavity therebetween and said first nut having a plurality of passageways therethrough from the exterior of said first nut to said annular cavity for injection of sealant, an injectable sealant injected through said passageways and filling and sealing said cavity, said sealant filling said passageways in said first nut thereby locking said first nut in place and said second nut having on its surface facing said annular cavity a portion that is recessed relative to the remainder of the surface and said sealant filling said recessed portion thereby locking said second nut in place.

References Cited in the file of this patent

UNITED STATES PATENTS

| | | |
|---|---|---|
| 103,348 | Ligon | May 24, 1870 |
| 197,923 | Carney | Dec. 11, 1877 |
| 271,026 | Bradford | Jan. 23, 1883 |
| 752,156 | Hacker | Feb. 14, 1904 |
| 837,767 | Aims | Dec. 14, 1906 |
| 1,030,306 | Hull | June 25, 1912 |
| 1,107,298 | Glauber | Aug. 18, 1914 |
| 1,183,354 | Dittman | May 16, 1916 |
| 1,230,375 | Burns | June 19, 1917 |
| 1,849,206 | Sater | Mar. 15, 1932 |
| 2,132,667 | Wilson | Oct. 11, 1938 |
| 2,533,868 | Anderson | Dec. 12, 1950 |
| 2,793,830 | Nakaji | May 28, 1957 |
| 2,821,416 | Soehnlen | Jan. 28, 1958 |

FOREIGN PATENTS

| | | |
|---|---|---|
| 541,608 | Belgium | Oct. 15, 1955 |